United States Patent [19]
Barrett et al.

[11] 4,069,399
[45] Jan. 17, 1978

[54] TDM PCM COMMUNICATION SYSTEM

[75] Inventors: Bruce Robert Barrett, Hazeldean; Alan Stanley John Chapman, Kanata, both of Canada

[73] Assignee: Northern Electric Company, Limited, Montreal, Canada

[21] Appl. No.: 632,548

[22] Filed: Nov. 17, 1975

[51] Int. Cl.² .................................................. H04J 3/00
[52] U.S. Cl. ............................ 179/15 AL; 179/15 AT
[58] Field of Search ....... 179/15 AL, 15 AQ, 15 AT, 179/15 BA, 18 FC

[56] References Cited
U.S. PATENT DOCUMENTS

| | | | |
|---|---|---|---|
| 3,217,106 | 11/1965 | Muroga | 179/15 AQ |
| 3,281,537 | 10/1966 | Dupieux | 179/15 AQ |
| 3,596,000 | 7/1971 | Lutz | 179/15 AQ |
| 3,643,030 | 2/1972 | Sparrendahl | 179/15 AL |
| 3,705,266 | 12/1972 | Philip | 179/15 AQ |
| 3,740,483 | 6/1973 | Pedersen | 179/15 AQ |
| 3,840,704 | 10/1974 | Baugh | 179/15 AQ |
| 3,894,189 | 7/1975 | Edstrom | 179/15 AQ |
| 3,906,159 | 9/1975 | Lutz | 179/15 AQ |
| 3,924,077 | 12/1975 | Blakeslee | 179/15 AL |
| 3,930,125 | 12/1975 | Picandet | 179/15 AQ |

*Primary Examiner*—David L. Stewart
*Attorney, Agent, or Firm*—Frank Turpin

[57] ABSTRACT

A TDM PCM communication system includes a plurality of user terminals, a switching network and a CPU for controlling the establishment of transmission paths between the user terminals and the switching network for the transfer of information between predetermined ones of the user terminals. An incoming path carries information bits from the user terminals to the switching network and an outgoing path carries information bits from the switching network to the user terminals. The switching network includes means for transferring single information bits each residing in a time slot period from the incoming path to the outgoing path. The transferring means includes an exchange means for effecting a bilateral exchange of information bits in fixed pairs of time slot periods, whereby paths for information bit transmission are periodically provided between ones of the user terminals, as determined by the CPU. PCM words are thereby exchanged bit by bit between user terminals enabled in fixed pairs of time slot periods.

8 Claims, 6 Drawing Figures

TDM PCM COMMUNICATION SYSTEM

INTRODUCTION

The present invention relates generally to time division multiplex (TDM) systems using pulse code modulation (PCM) signals and more particularly to a novel method and apparatus for exchanging information between various user terminals of a TDM PCM system.

BACKGROUND OF THE INVENTION

TDM telephone systems operate on a time division basis, that is a number of conversations share a single communication path. Conversations are each assigned to the communication path for short periodically recurring intervals. Samples of the conversation are coded into corresponding binary words using pulse code modulation techniques. These words are transmitted over the communication path during assigned time slots and are decoded into the original conversations, in receiving terminals. A TDM switching system usually has two outgoing paths and two incoming paths connectd between a network in the switch system and the associated user communication terminals. A conversation between two user terminals is allocated one time slot and is transmitted via the incoming and outgoing paths. Both of the incoming and outgoing paths are used to maintain each side of the conversation separate from the other. The network determines the incoming paths and outgoing paths of the two user terminals and the signal on the incoming path of one is transferred to the outgoing path of the other. The user terminals are enabled under the control of an interconnection memory in the switching system. The memory includes a word location corresponding to each time slot in a time slot frame. The memory word at each location contains the address of the two terminals to be connected together, as well as the identity of the paths which need to be enabled to achieve the interconnection.

When the capacity of such a system is expanded, additional pairs of incoming and outgoing paths are needed and space and time switching is required to enable the user terminals associated with the different pairs of paths to converse. This requires a corresponding expansion in memory capacity. In addition, an expansion of the length of the memory words themselves becomes necessary. Each word must now contain time slot information to enable a data memory to transfer samples between time slots and space switch information to enable a space switch to interconnect various of the incoming and outgoing paths are required. Hence, the increased cost of memory capacity is usually disproportionately large relative to the increase in the number of user terminals.

One example of a time division switching system is taught by M. J. Marcus in U.S. Pat. No. 3,573,381 issued on Apr. 6, 1971 and entitled "Time Division Switching System". This system has a plurality of combination space switching and data storage devices which transpose data between various time channels during its transmission between multichannel, time multiplex highways. Although the system is quite flexible and has a high traffic capability, it requires a substantial amount of memory, both for controlling the operation of the switching network and for storing the data being transmitted.

Another example of a time division switching system is described in U.S. Pat. No. 3,694,580, issued on Sept. 26, 1972 to Hiroshi Inose and Tadao Saito and entitled "Time Division Switching System". This system switches individual information bits of pulse code modulation words between various time slots and time division buses. FIGS. 4A and 4B depict pulse shifters which each include two shift registers and a gating matrix connected between the shift registers. The gating matrix is controlled by memory to select a new sequence of the information bits in each frame. This system is relatively flexible and has a high traffic capability; however, a substantial amount of memory is required for the control of the pulse shifters.

Prior TDM PCM switching systems in general require large amounts of memory and provide high traffic handling capability. In the situation where only a few hundred telephones and relatively low traffic requirements exist, the known PCM TDM systems are too expensive to provide a practical alternative to other forms of TDM systems, such as pulse amplitude modulation (PAM) or delta modulation systems. On the other hand, telephone systems tend to expand with the passage of time. Because of their cost advantage, PAM or delta modulation systems are acceptble in a small system in spite of their well-known disadvantages. However, they are not acceptable in larger systems where the their cost advantage is insignificant or non-existent.

The private branch exchange (PBX) user is presently faced with the choice of initially installing a prohibitively expensive TDM PCM system which is much larger than his present requirement, or a much less expensive system which is expensive to enlarge or cannot be expanded. More often than not, the less expensive system which meets his present requirements but cannot economically meet his future requirements is chosen. However, beyond a certain system size, expansion costs increase rapidly. At some time a new and larger system must be substituted for the old system. Of course, the purchasing and installing of a new system results in substantial expenditures in addition to the cost and inconvenience of removing and disposing of the old system.

SUMMARY OF THE INVENTION

The present invention provides an expandable TDM PCM communication system which is cost competitive at the low end of its capacity and in which the cost of adding additional lines to the system is proportionally small relative to the increase in the system's size. An interconnection memory in a network circuit is associated with a group of user terminals. The memory has only as many word locations as there are time slots and the word at each location need only be of sufficient length to accommodate one user terminal address and one network circuit address. As the system expands, additional network circuits are interconnected via a network bus, however without requiring any increase in the word length of the interconnection memory. In the network circuit, a unique time slot interchange circuit performs a sequential time slot interchange function which precludes user terminal pair conversation other than in opposite time slots of pairs of fixed time slots.

A plurality of user communication terminals is connected to a network circuit via an incoming and an outgoing transmission path. In the network circuit, the time slot interchange circuit for exchanging information bits between the time slots of fixed pairs of time slots is connected in series between the two paths. A memory having n word locations corresponding to n time slots is loaded with user terminal addresses. A time slot address generator generates time slot addresses cyclically in response to the clock signals. The time slot addresses cause the memory to output user terminal addresses on a one per time slot basis. Individual ones of the user terminals respond to predetermined terminal addresses by receiving an information bit from the outgoing path and by transmitting an information bit onto the incoming path.

To expand the system a plurality of network circuits are interconnected via a network bus. Each network circuit includes a space switch. The space switch has a plurality of inputs, connected to a plurality of paths in the network bus. The space switch is responsive to a plurality of bits in a terminal address from the memory to transfer an information bit appearing at one of its inputs to its output.

In accordance with the invention a TDM PCM communication system having a plurality of user terminals, a switching network and a control circuit means for controlling the establishment of transmission paths between the user terminals and the switching network for the transfer of information between predetermined ones of the user terminal, is provided. An incoming path carries information bits from the user terminals to the switching network and an outgoing path carries information bits from the switching network to the user terminals. The switching network includes means for transferring single information bits each residing in a time slot period from the incoming path to the outgoing path. The transferring means includes an exchange means for effecting a bilateral exchange of information bits in fixed pairs of time slot periods, whereby paths for information bit transmission are periodically provided between ones of the user terminals, as determined by the control circuit means.

Also in accordance with the invention a method for operating a TDM PCM communication system generally as described above, is provided. Sequences of an even number n of time slot addresses are continuously generated. During the period of each time slot address occurrence an information bit is received from the incoming path. The received information bits are bilaterally exchanged between fixed pairs of time slot periods and transmitted on the outgoing path. One and the other user terminals are enabled during one and the other respective occurrences of the time slot addresses of a fixed pair of time slots. Each enabled user terminal is caused to receive one of the information bits transmitted on the outgoing path, and on the incoming path to transmit an information bit advanced by one in the order of bit significance in the PCM word format relative to the significance of the information bit received from the outgoing path. By this method m bit PCM words are exchanged bit by bit between user terminals enabled in fixed pairs of time slot periods.

In one arrangement, in each frame of an even number n of time slots, the time slots of each fixed pair are separated in time by n/2 − 1 time slot periods. Each bit transmitted from a user terminal is delayed n/2 time slot periods before it is received by a user terminal.

In another arrangement, the time slots of each fixed pair are adjacent one another. Each bit transmitted from a user terminal is delayed n time slot periods plus or minus one time slot period, depending upon whether the instant time slot is even or odd, before the bit is received by a user terminal.

DESCRIPTION OF THE DRAWINGS

The structure and operation of an example embodiment of the invention will now be described with reference to the accompanying drawings in which.

DETAILED DESCRIPTION

The example embodiment is illustrated and described in terms of functional circuit blocks, as each of the individal circuit functions is well known and may be provided by "off-the-shelf" integrated circuits or other circuitry well known to those skilled in the art.

Figure 1:
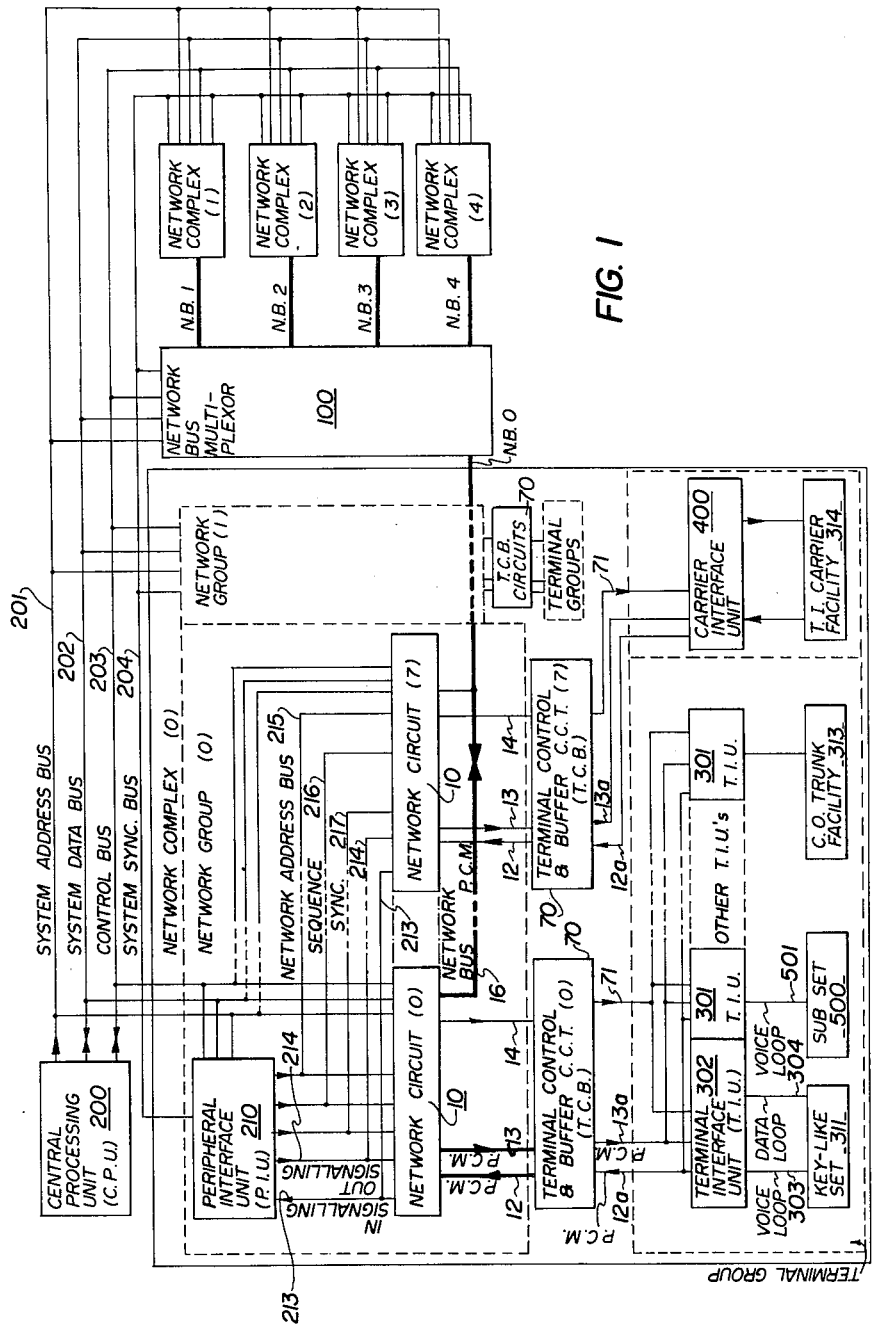
FIG. 1 is a block diagram of a TDM PCM switching system in accordance with the invention.

Referring to FIG. 1, a central processing unit (CPU) 200 is connected with network complexes 0 through 4 and to a network bus multiplexer 100 via a system address bus 201, a system data bus 202 and a control bus 203. The system address bus 201 carries address words from the CPU 200 to the remainder of the system. The various parts of the system respond to unique addresses to provide for communication with the CPU 200 via the system data bus 202. The system data bus carries instruction data words from the CPU 200 to the rest of the system, and also carries data originating in various parts of the system back to the CPU 200. The control bus 203 is a group of leads, each having a specific signalling function. For example, some leads in this bus are used to indicate to the CPU 200 the completion of various functions in the network complexes and the network bus multiplexer 100. The CPU 200 can be a special purpose computer designed specifically for use in this system or it can be a suitably programmed general purpose computer.

Figure 5:
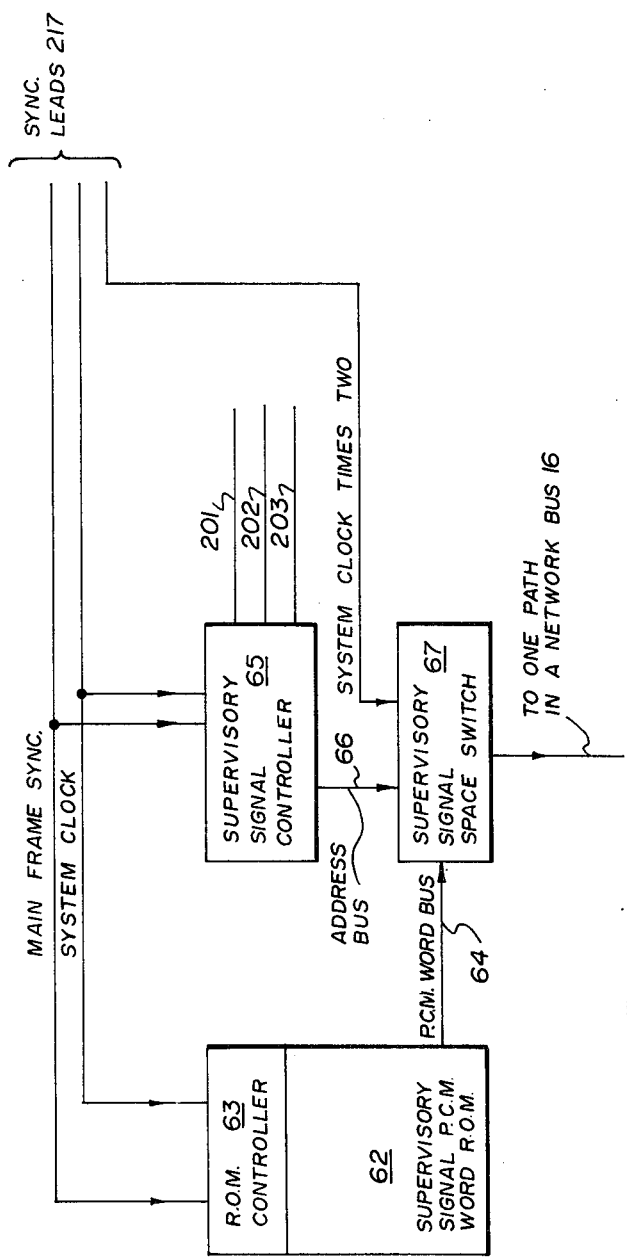
FIG. 5 is a detailed block diagram of part of FIG. 1.

Each network complex includes groups of network circuits 10 and peripheral interface unit 210. In FIG. 1, eight (0 to 7) network circuits 10 are served by one peripheral interface unit (PIU) 210. The smallest possible system would have one network circuit 10. A network bus 16 is provided to interconnect the network circuits 10 and one or more service circuits, for example as illustrated in FIG. 5. The network bus 16 provides one output transmission path for each network circuit 10 and in this case, up to a maximum of sixteen paths. Where there is more than one network complex, the network bus multiplexer 100 is required to provide for space and delay switching between two or more network buses 16.

Figure 6:
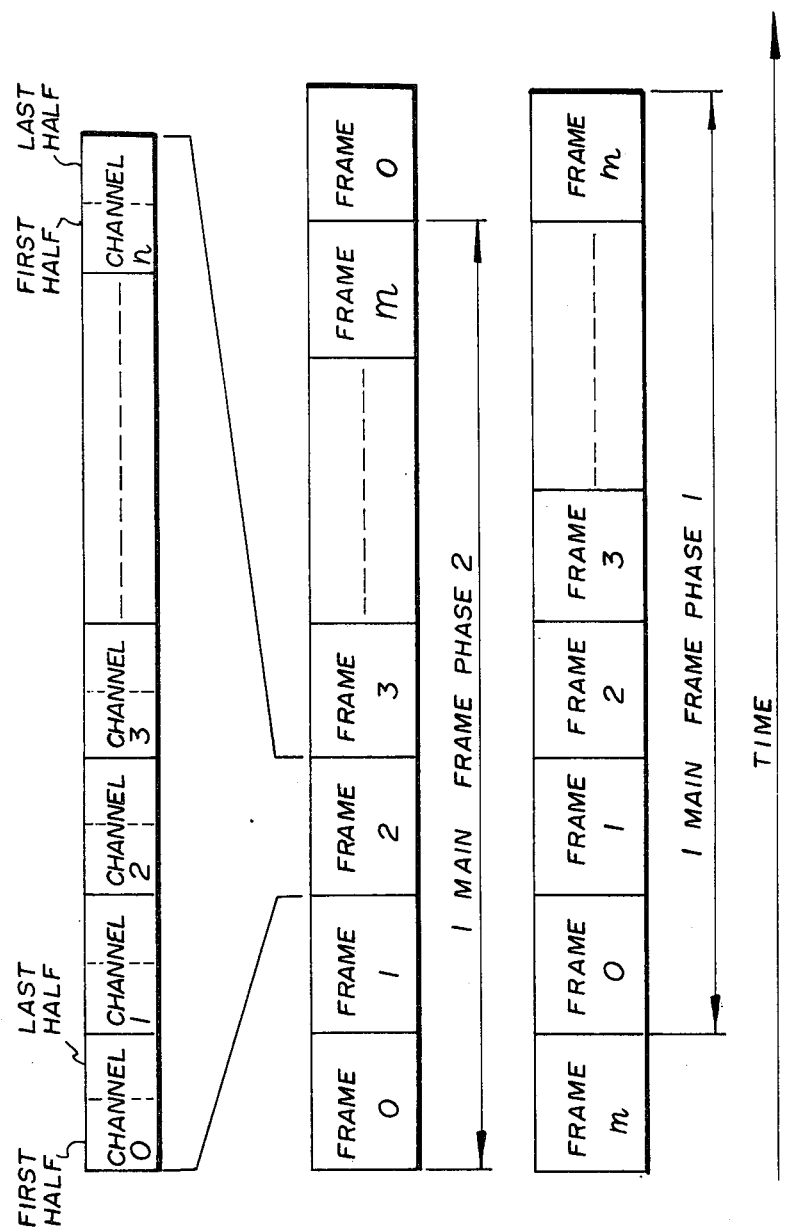
FIG. 6 is a graphical representation of a PCM format compatible with the system of FIG. 1.

FIG. 6 illustrates the PCM format which is used in the system of FIG. 1. A main frame consists of m frames and each frame consists of n single time slots, each time slot having first and last halves. Each path in the network bus 16 is capable of carrying 2n PCM words in a main frame. Each PCM word has a single information bit residing in a prescribed half time slot in each of the frames. All the network circuits 10 are capable of transferring information bits each to a path in the network bus during the first half of a time slot and capable of receiving an information bit from the network bus during either half of a time slot.

In a basic system one PIU 210 generates system clock signals and frame synchronization signals. In an expanded system having more than one network complex, the network multiplexer 100 generates these signals and provides them for each network complex via the system synchronization bus 204. Communication between each PIU 210 and the CPU 200 is via the system address bus 201, the system data bus 202 and the control bus 203. Each PIU 210 is individually accessable by the CPU 200 in response to a predetermined address transmitted by the CPU 200 on the system address bus 201.

AS the network complexes are identical, only one network complex will be described in more detail. Time slot synchronization and main frame synchronization for the network circuits 10 are provided from the PIU 210 via a synchronization bus 217. In addition to this timing function, the PIU 210 also provides a storage buffer function for the transfer of signalling and supervisory information between the network circuits 10 and the CPU 200. Signalling is carried to and from the network circuits 10 in serial form via signalling leads 214 and 213 respectively. Signalling is exchanged between the PIU 210 and the CPU 200 in parallel form via the system data bus 202.

The PIU 210 also provides a network circuit signalling scanning function. Each network circuit 10 is accessed on a recurrent basis, under the control of network addresses generated in the PIU 210. The network addresses are distributed to the network circuits 10 over a network address bus 215. When a network circuit 10 is accessed by its unique network address, it may provide an indication for signalling to the PIU 210 via the signalling lead 213. If so, the scanning function is halted at that network circuit address until the signalling signals are serially transmitted via the signalling lead 213.

Each network circuit 10, in a network complex, is connected with the CPU 200 via the system address bus 201, the system data bus 202 and the control bus 203. Each network circuit 10 is also connected to an incoming transmission facility on line 12 and an outgoing transmission facility on line 13. The lines 12 and 13 carry PCM information bits between the network circuits 10 and terminal control and buffer circuits (TCB) 70. Each TCB relays the PCM information bits to and from terminal interface units (TIU) 301 and 302, or a carrier interface unit 400, via lines 12a and 13a. Terminal addresses and ancillary control signals are transmitted from each network circuit 10 to each of the TCBs 70 via terminal control buses 14. The TCBs 70 decode the terminal addresses and the ancillary control signals to enable selected ones of the TIUs via a bus 71. Each of the TIUs 301 and 302 has a user terminal directly or indirectly associated with it. The maximum number of user terminals which can be actively connected in this manner is limited by the number of available time slots whereas the total number of user terminals is limited only by the minimum acceptable grade of service at the maximum expected traffic level.

Each of the terminal interface units is adapted to provide an interface for a particular type of communication facility, such as analogue and digital trunks, and communication terminals, such as subscriber telephones, key-like telephones and data terminals. For example, the TIUs 301 are shown connected with a subscriber set 500 and connected with central office trunk facility 313. A terminal interface unit (TIU) 302 and a key-like set 311 have been developed to take advantage of the features available in this embodiment.

The key-like set 311 is connected to the TIU 302 via an analogue voice loop 303 and a duplex data loop 304. However this facility is not the subject of this disclosure and is more fully described in a copending application by K. Korver entitled "Full Duplex Data Transmissing System Using Two Speeds of Diphase Signal For Simplified Sync." U.S. Pat. No. 3,936,602 issued on Feb. 3, 1976.

When two terminal interface units, are required to exchange information, their respective terminal addresses are supplied coincident with adjacent time slot periods by the asssociated network circuit(s). Hence, each of the TIUs extracts information from the line 13 and applies information to the line 12 during its assigned time slot. In a system having $n$ channels, the network circuit effectively delays the information in each time slot by $n$ time slot periods plus or minus one time slot period. For example, the information received in the time slot two is applied to the line 13 during time slot three, and the information received in time slot three, is applied to the line 13 during time slot two.

Network Circuit

Figure 2:
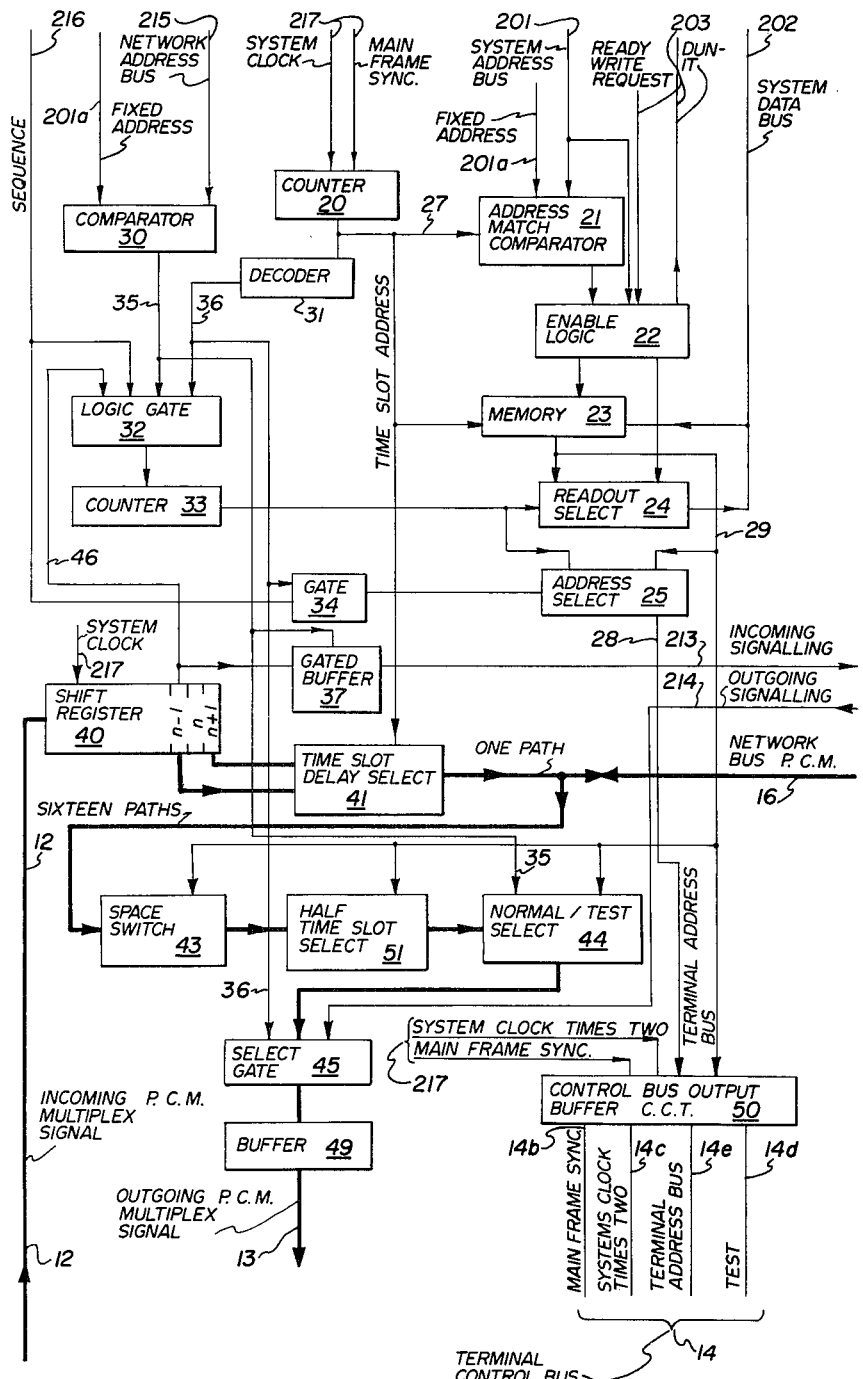
FIG. 2 is a detailed block diagram of part of FIG. 1.

FIG. 2 is a block diagram of a network circuit 10 of FIG. 1. The network circuit provides the interchange of time slot information, space switching, and terminal addresses under the direction of the CPU 200. In this particular embodiment, the network circuit 10 may be viewed in two portions, a network control control circuit and a network switching circuit.

The control circuit portion includes a counter 20 for generating the time slot addresses, and a memory 23 and associated circuits for providing the terminal addresses in response to the time slot addresses. The terminal addresses are written into the memory 23 by the CPU 200 in response to changes in the state of the user terminals associated with the network circuit 10. The counter 20 is driven by system clock signals, having a frequency of about two MHz, and main frame synchronization signals at a sub-multiple frequency, about eight KHz, from the synchronization bus 217. The main frame synchronization signals ensure that all the network circuits 10 are synchronized one with the other. The counter 20, counts the system clock signals and derives therefrom thirty-two time slot addresses. The occurrence of thirty two time slot addresses corresponds to a frame. Eight frames occur in the interval between two main frame synchronization signals, thus providing for the transmission of eight bit PCM words. An address match comparator 21 is connected to a fixed network address, which is determined by the physical location of the network circuit 10 in the system. The fixed address, in all cases is provided by fixed address leads 201a. The time slot addresses, supplied via leads 27 from the counter 20, in combination with the fixed address are compared by the comparator 21 with a portion of the system address on the system address bus 201, to determine if a match occurs. A further portion of the system address is decoded in the input circuitry of the comparator 21 to determine if the system address is acceptable for a network circuit. If the address is acceptable and a match occurs, the comparator 21 supplies a match signal to a memory enable logic circuit 22. The logic circuit 22 also accepts 1 bit from the system address bus 201, and read and write request from the CPU 200 via the control bus 203.

Writing into the Network Circuit

A memory 23 stores the terminal addresses, required for controlling the operation of the network circuit 10 and the associated user terminals. The memory 23 includes thirty-two word locations for storing terminal addresses. The memory is accessed sequentially as determined by the time slot addresses on the leads 27 from the counter 20. In the presence of a match signal from the comparator 21 and a write request from the CPU 200 presentd via the control bus 203, the memory 23 is enabled by the enable logic circuit 22 to store the state of the data bus 202, at a memory location as determined by the time slot address. Immediately after the memory 23 is enabled, the enable logic circuit 22 also sends a "dun-it" signal on a lead in the control bus 203, to indicate to the CPU that the memory has been loaded. By this means the CPU 200 is permitted to write data into a network circuit at predetermined times and memory locations as determined by the time slot addresses.

Reading from the Network Circuit

There are two sources in the network circuit which may be read directly by the CPU 200, the memory 23 and a counter 33, to be described later. A readout select circuit 24 is connected to the memory 23 via leads 29 and to the output of the counter 33. The logic circuit 22 generates a read memory signal or a read scan signal, depending on the state of the one bit it receives from the address bus. The logic circuit 22 generates this signal in the presence of a match signal from the comparator 21 and a read request from the CPU 200 presented via the control bus 203. The readout select circuit 24 responds, to the read signal generated by the logic circuit 22, by transferring the output from the memory 23 or the output from the counter 33 to the system data bus 202. The enable logic circuit 22 as in the case of writing also sends the "dun-it" signal to the CPU immediately after the output data from the memory 23 or the data from the counter 33 appears on the bus 201. In this case the "dun-it" signal indicates to the CPU that the data is available on the bus 201.

Scanning Control

The PIU 210 generates network circuit addresses which are compared by a comparator 30, with the fixed address of a network circuit 10. When a correspondence between the fixed address and the network circuit address occurs, the comparator 30 provides an enable signal on a lead 35. It is during the presence of this enable signal that the signalling function occurs between the PIU 210 and a user terminal connected with incoming and outgoing lines 12 and 13. A decoder 31 decodes the time slot addresses from the counter 20 to provide a time slot zero signal on a lead 36 with the occurrence of each time slot address zero. When active signalling is not being carried on, a logic gate 32, passes the time slot zero signal onto the counter 33. The counter 33 generates terminal scan addresses. As described before, the output from the counter 33 is available to the data bus 202 via the readout select circuit 24.

Terminal Access

The output from the counter 33 and eight of the leads 29 from the output of the memory 23 are connected to a terminal address select circuit 25. The select circuit 25 is controlled to select a scan address from the counter 33 in the presence of a time slot zero signal connected to the select circuit 25 via an inhibit gate 34. In the absence of the time slot zero signal from the inhibit gate 34, the circuit 25 selects eight bits of a terminal address from the memory 23. During signalling from the PIU 210, the gate 34 is controlled via the sequence lead 216 to inhibit the passage of time slot zero signals to the select circuit 25. Hence, the terminal address at the time slot zero address word location in the memory 23 is selected instead of the output from the counter 33.

Figure 3:
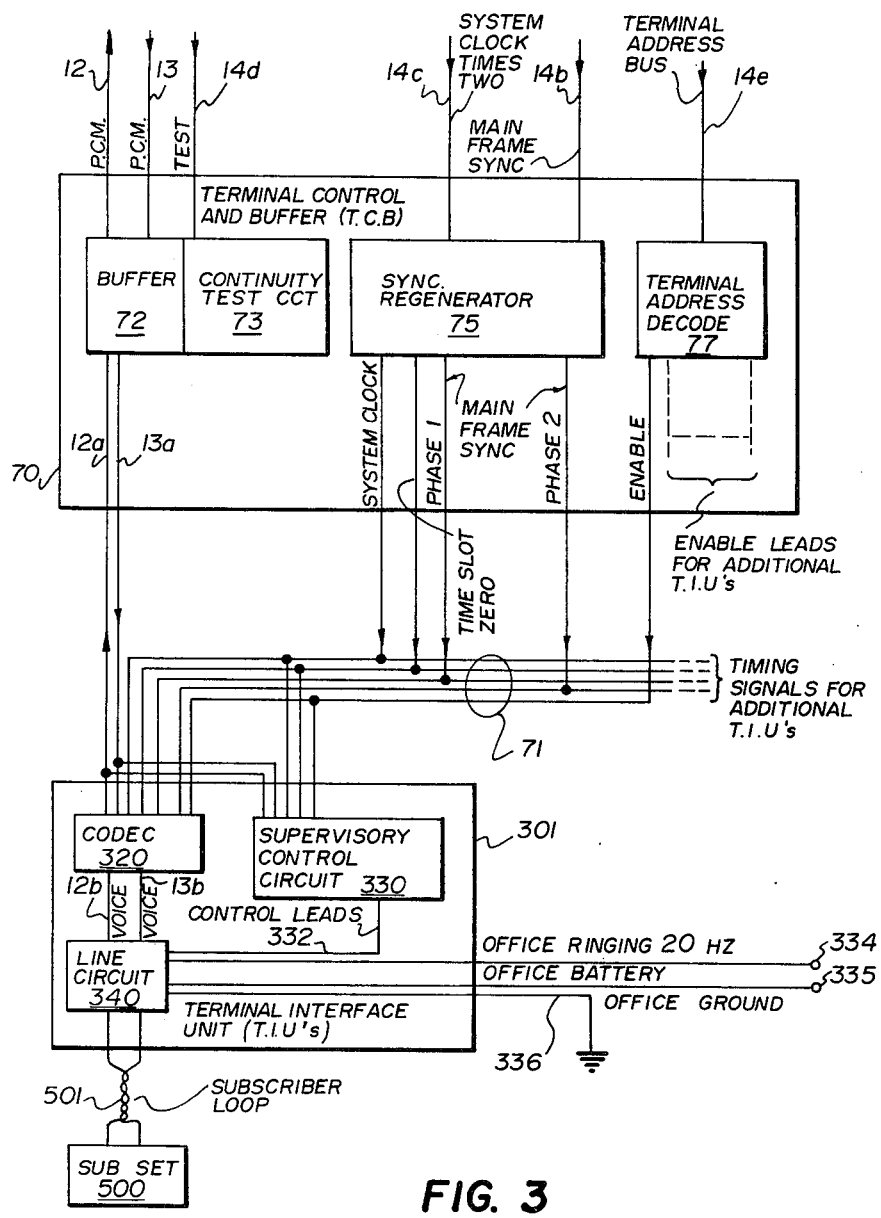
FIG. 3 is a detailed block diagram of part of FIG. 1.

The selected address is transmitted via a terminal address bus 28 from the output of the address select circuit 25 to the input of a control bus output buffer circuit 50. The buffer circuit 50 drives a terminal control bus 14, which includes a terminal address bus 14e for carrying the terminal addresses to the terminal control and buffer circuit (TCB) 70 as shown in FIG. 3. System clock times two and main frame synchronization signals are connected to the buffer circuit 50 via synchronization leads 217. These signals are buffered and carried to the TCB 70 via leads 14c and 14b. A test control lead 14d is connected from the output of the buffer circuit 50 to the TCB 70.

Network Switching Circuit Portion

The switching portion of the network circuit 10 carries and manipulates all of the PCM signals appearing on the lines 12 and 13. A buffer circuit 49 drives the outgoing line 13. Each of the terminal interface units (TIU) responds to a mutually exclusive predetermined eight bit terminal address appearing on the terminal address bus 14e. The TIU, addressed during a particular time slot, accepts information from the outgoing line 13 and output information onto the incoming line 12. In the presence of a test control signal on the test line 14d, the TIU merely transfers the data from the line 13 to the line 12. By this means, speech path continuity may be verified by the network circuit 10. Main frame synchronization signals and symmetrical double rate clock signals are supplied to all the TIUs via the leads 14b and 14c respectively, to enable the codecs therein to decode and encode PCM information in a well known manner. However, signals transmitted on the incoming line 12 are advanced in order of significance by one frame relative to the signals received from the outgoing line 13.

Signals transmitted from the TIUs on the incoming line 12 are received serially by the first stage of the shift register 40. The information is shifted serially through the shift register 40 by the system clock signal connected to the shift register 40 via one of the leads 217. The shift register 40 is arranged such that the total time delay from the last stage of the shift register 40, through the system via the lines 13 and 12 and through the shift register 40 is one time slot period greater than the frame length of the system. Hence, since a frame length is 32 time slot periods, the delay of the $n$th stage of the shift register 40 is 33 time slot periods. The bits of information in the $n - 1$ stage and the $n + 1$ stage of the shift register 40 are connected to a time delay select circuit 41. The time delay select circuit 41 is controlled at the system clock rate by the least significant bit of the time slot addresses from the counter 20 to select thirty-one ($n - 1$) or thirty-three ($n + 1$) time slot period delays depending upon the time slot address being even or odd. A bilateral exchange of information bits between fixed pairs of time slots is thereby effected as for example shown in the following abbreviated table.

TIME SLOT ADDRESS — 0 1 2 2 4 5 — 30 31

INFORMATION BIT SEQUENCE — 0 1 2 3 4 5 — 30 31
DELAYED INFORMATION BIT SEQUENCE 1 0 3 2 5 4 — 31 30

Information bits falling in even time slot addresses are delayed 33 time slot periods to correspond with the odd time slot addresses and information bits falling in odd time slot addresses are delayed by thirty-one time slots to correspond with the even time slot addresses. Hence, time slots 2 and 3 are continously interchanged, time slots 4 and 5 are continuously interchanged and so on. For example a time slot 2 terminal, receives time slot information from a time slot 3 terminal, while the time slot 3 terminal receives time slot information from the time slot 2 terminal. The active user terminals are determined by the terminal addresses, from the memory 23, and are accessed as previously described.

The output of the time slot delay select circuit 41 is connected to one of sixteen paths in the network bus 16. The network paths provide for interconnections between terminals associated with other network circuits. All sixteen of the network paths enter a space switch 43 in each of the network circuits. The space switch 43 is controlled by four data word bits connected directly from the output of the memory 23. An address select function similar to that provided by the address select circuit 25 is not required, as the network bus 16 does not carry any supervisory signalling information. The space switch 43 accordingly selects one of the paths in the network bus 16 and presents information residing in the time slot to a half time slot select circuit 51, which is required for the operation of the network link multiplexer 100 as will be described later. The time slot resident information appears at the output of the select circuit 51 and is presented to the input of a normal/test select circuit 44. The circuit 44 responds to two bits on the leads 29, to either pass the time slot resident information or the test information onto a select gate 45. As mentioned before, when a terminal interface unit is tested under the control of a test signal on the line 14d, it merely passes the test information from the outgoing line 13 to the incoming line 12. The normal/test select circuit 44 uses the test information it has generated along with the appropriate time slot information it receives to verify the TIU PCM voice path continuity. The select gate 45 accepts time slot resident information from the select circuit 44 or system signalling signals from the outgoing signalling lead 214. The select gate 45 provides system signalling signals at its output only in the case where time slot zero is decoded by the decoder 31 and an enable signal is provided by the comparator 30. In all other cases, the output from the normal/test select circuit 44 is passed on by the select gate 45 to the outgoing line 13 via the buffer circuit 49.

Signalling

In the foregoing description, the signalling circuitry and functions have been described only so far as was necessary to demonstrate the normal time slot resident information transfer betwen various terminal interface units. A more detailed description of the signalling function follows:

Outgoing Signalling

To achieve the function of signalling from the PIU 210 to a terminal interface unit (TIU), the desired terminal address is loaded into the memory 23 from the system data bus 202, (at memory address zero, during time slot zero). The PIU 210 receives and stores the data content of the signalling from the CPU 200 via the system data bus 202. Thereafter, a control signal generated in the PIU 210 and connected to the logic gate 34 via the sequence lead 216 causes the logic gate 34 to prevent time slot zero signals from reaching the address select circuit 25. Hence in time slot zero, the terminal address is derived from the data at address location zero of the memory 23. Time slot zero signals cause the select gate 45 to provide the buffer 49 with the signalling data, at each time slot zero. The signalling data is supplied serially from the PIU 210, via the outgoing signalling lead 214, and the outgoing line 13 to the addressed TIU, until all the signalling data is transferred.

Incoming Signalling

In order for a TIU to send signalling to the CPU 200, the TIU must first notify the PIU 210 of a request to signal and thereafter, the PIU 210 must itself provide an enable indication to the TIU via the outgoing signalling routine.

An accessed TIU provides notification by inserting a "one" bit into time slot zero on the line 12. When the one bit appears at the $n - 1$ stage in the shift register 40, it is transferred to the logic gate 32 via a lead 46. The logic gate 32 responds by inhibiting the zero time slot signal from being passed to the counter 33. Hence the scanning function is interrupted and in each following time slot zero the same TIU is continuously accessed while the remainder of the TIUs are not. The accessed TIU continues to send the one bit in each following time slot zero until further action is taken by the PIU 210. The PIU 210 continuously generates a cyclic sequence of network addresses. When a match occurs between a network address and the network circuit fixed address, the comparator 30 provides an enable signal to the logic gate 32 and to a gated buffer 37 via the lead 35. In the presence of the enable signal, the gated buffer 37 passes information at time slot zero from the second last stage of the shift register 40 onto the incoming signalling lead 213. Hence the "one" bit is recieved by the PIU 210, which causes the cyclic sequence of network addresses to be halted and the instant network address to be maintained for the duration of the following signalling sequence. The enable signal from the comparator 30 also causes the select gate 45, during time slot zero to accept signalling data from the PIU 210, via the signalling lead 214. The PIU 210 enables the accessed terminal by sending a predetermined sequence of serial data bits onto the outgoing line 13 via the signalling lead 214, the gate 45 and the buffer 49. In response, the TIU sends serial signalling data via the incoming line 12, shift register 40, buffer 37 and the outgoing signalling lead 214, to the PIU 210. The PIU 210 receives the signalling data over a successive number of time slots zero and stores the data so that it is accessible by the CPU 200, on demand. When the data is stored, the PIU 210 and the network circuit return to the normal scanning or signalling function until another signalling input or output sequence is initiated.

Terminal Interface Units and Terminal Control and Buffer Circuit

FIG. 3 is a detailed block diagram of the terminal control and buffer circuit (TCB) 70 and one of the TIUs 301 shown in FIG. 1. There is one TCB 70 associated with each network circuit 10. The TCB 70 provides a PCM signal buffer function, decode function, and timing function for approximately one hundred and fifty of the TIUs 301. The TCB 70 includes a PCM signal buffer 72 which acts as a repeater for PCM signals. Outgoin and incoming PCM signals are connected between the buffer 72 and a network circuit 10 via an outgoing PCM line 13 and an incoming PCM line 12 respectively, as shown in FIGS. 1 and 2. Outgoing and incoming PCM signals are connected between the buffer 72 and a codec 320 in each TIU 301 and a supervisory control circuit 330 in each TIU 301 via outgoing and incoming PCM lines 13a and 12a respectively.

The TCB 70 also includes a synchronization regenerator 75 and a terminal address decode circuit 77. The terminal address decode circuit 77 accepts terminal addresses from the network circuit 10 via the terminal address bus 14e in the terminal control bus 14 and provides a single lead enable in a control bus 71 to the appropriate TIU 301 as determined by the content of each terminal address. When unassigned time slots occur, the content of the terminal address indicates that no enable is provided. The synchronization regenerator 75 receives main frame synchronization signals and systems clock times two signals from the network circuit 10 via leads 14b and 14c respectively, of the terminal control bus 14. The synchronization regenerator 75 is supplied with the system clock times two signals rather than with the system clock signals to enable the regeneration of accurate timing signals by relatively simple circuitry. From these signals, the synchronization regenerator 75 provides the TIUs 301 with system clock signals, time slot zero indication signals, and phase 1 and phase 2 main frame synchronization signals via leads in the control bus 71. As shown in FIG. 6 phase 2 is displaced from phase 1 by an advance of one frame period. The signals from the synchronization regenerator 75 are supplied to the codecs 320 and the supervisory control circuits 330, with the exception of the phase 2 main frame synchronization signals which are only supplied to the codec 320. In FIG. 3, the TIU 301 contains a line circuit 340 which is connected to a telephone subset 500 via a subscriber loop 501. However variations of the line circuit 340 are required in the other TIUs 301 to connect with, for example, 2-wire or 4-wire analogue trunk facilities. The line circuit 340 is connected to the codec 320 via outgoing and incoming analogue voice leads 13b and 12b respectively. Ringing (20 Hz), and office battery and ground are supplied to the line circuit 340 on leads 334, 335 and 336 respectively.

In operation, each time an enable signal appears on the bus 71, the associated codec is caused to receive a PCM information signal bit and transmit a PCM information signal bit. The order of significance of each transmitted PCM information signal bit is determined by the phase 2 main frame synchronization signals. The order of significance of each received PCM information signal bit is determined by the phase 1 main frame synchronization signals. This compensates for the delay inherent in the transmission of time slot resident information between two TIUs.

In the codec 320, analogue voice band signals are received from the subset 500 via the subscriber loop 501, the line circuit 340 and the incoming lead 12b. These analogue signals are encoded into PCM words for transmission on the line 12a. PCM information signal bits are received from the line 13a and assembled into PCM words. The PCM words are converted into voice band signals and transmitted to the subset 500 via the line circuit 340 and the subscriber loop 501.

The line circuit 340 may be realized using well known circuitry. Communication between the line circuit 340 and the supervisory control circuit is via control leads 332. The line circuit 340 provides the supervisory control circuit 330 with indication of the state of the subscriber loop 501 and is controllable by the supervisory control circuit 330, for applying supervisory signals (e.g. 20 Hz ringing) to the subset 500 as required.

The supervisory control circuit 330 responds to an enable signal, during the presence of a time slot zero indication, by sending or receiving serial signalling bits via the lines 12a and 13a, as previously described in conjunction with FIGS. 1 and 2. During a time slot zero indication, the codec 320 is inhibitd from receiving or transmitting an information bit.

The TCB 70 also includes a continuity test circuit 73 which is responsive to a predetermined signal condition on the test line 14d to cause the buffer 72 to transfer an information bit from the outgoing line 13 to the incoming line 12. By this means a continuity check is performed by the normal/test select circuit 44 in FIG. 2 to verify the operation of the lines 12 and 13 and the associated network circuit in FIG. 2.

In a typical system, TCB 70 will serve up to one hundred and fifty TIUs 301 and/or 302 depending upon traffic considerations. In FIG. 1, a carrier interface unit 400 is shown associated with a seventh TCB 70 which provides interface with a well known T1 carrier facility. This facility is shown merely to illustrate the versatility of the present switching system. This feature will not be discussed further other than to mention that the carrier interface unit 400 merely provides a reframing of the PCM words so that the switching system and the carrier facility are compatible.

Network Bus Multiplexer

Figure 4:
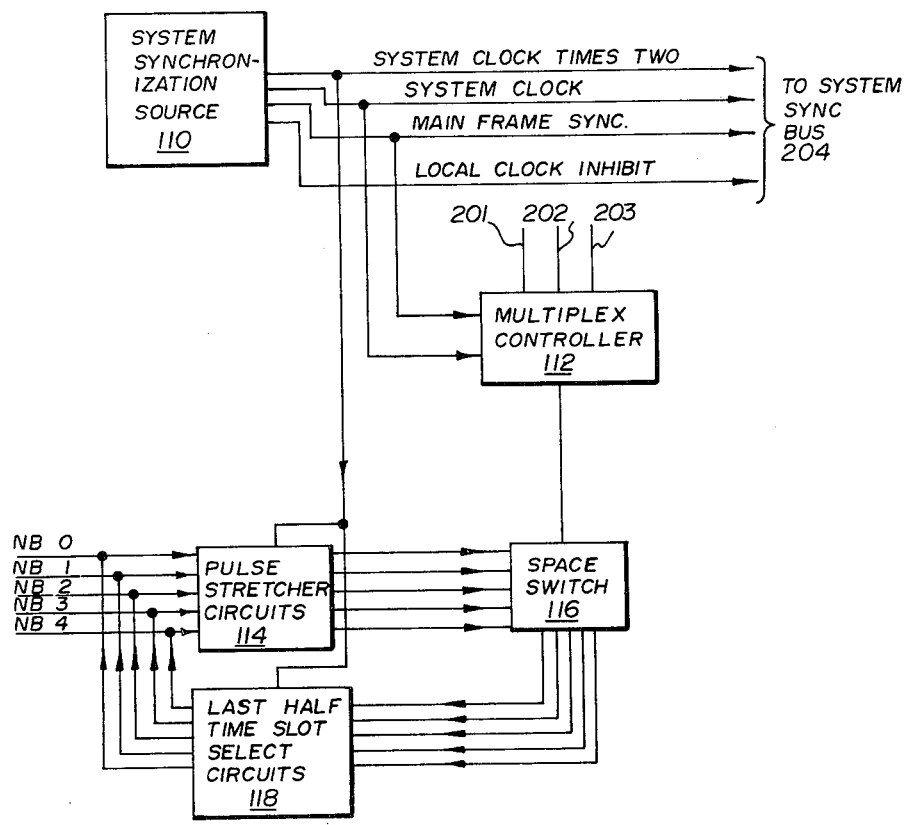
FIG. 4 is a detailed block diagram of part of FIG. 1.

The network bus multiplexer 100 is illustrated in more detail in FIG. 4 of the drawings. If a system is large enough to require more than fifteen network circuits 10, additional network buses are required. This is illustrated in FIG. 1 which shows network buses NB0 through NB4. The network bus multiplexer provides for information path interconnection between the network buses. In addition, it has been found practical to provide all the basic network complex timing function from the multiplexer 100. Hence, when a multiplexer is added to a system, the timing sourcce in each PIU 210 is slaved to a system synchronization source 110. The system synchronization source 110 provides system clock, system clock times two, main frame synchronization and local clock inhibit on appropriate leads in the system synchronization bus 204.

Each of the paths in each network bus has a separate input appearance at one of a group of bit stretching circuits 114. Each bit stretching circuit is controlled by system clock times two signals to receive an information bit during the first half of a time slot and output that information bit during the full time slot.

The output from each bit stretching circuit is connected to a space switch circuit 116. The circuit 116 is capable of transferring tme slot resident information from any one path in any one network bus to any one of four paths in any of the other network buses. For example, any information path in NB0 can be switched to any one of a designated four paths in NB1 through NB4. Alternate arrangements may be used, dependent upon internetwork bus traffic requirements.

The outputs of the space switch circuit 116 are each connected to one of a group of last half time slot select circuits 118 which are controlled by the system clock times two signals from the system synchronization source 110, to gate time slot resident information from the outputs of the space switch 116 to the network buses during the last half of each time slot. To receive information from user terminals associated with other network buses, the space switch 43, in FIG. 2, selects the required path in the network bus during the required time slot and passes the time slot resident information from that path to the input of the half time slot select circuit 51. The select circuit 51 transfers the information resident in the last half of the time slot to the buffer 49, under the control of a signal on one of the leads 29.

The space switch 116 is controlled by data words provided by a multiplex controller 112. The multiplex controller is similar to the control portion of a network circuit 10, in that time slot addresses are generated to control access to a memory which is writable by the CPU via the buses 201, 202 and 203.

Supervisory Signals

Supervisory signals, dial tone, ringback, etc., are typically required in any telephone system. In a PCM telephone system these signals may be provided by a group of signal generators for providing analogue signals as in a typical analogue telephone system. The analogue signals may be supplied as required to one or more PCM encoders and thereafter inserted into the system at the appropriate time and place.

In the system of FIG. 1, any one of the network circuits 10 may be substituted by various function circuits. A function circuit may process certain time slot resident information signals appearing on the network bus or may transmit information signals onto the network bus. One such circuit is a supervisory signal source wich is shown in FIG. 5. The supervisory signal source includes a supervisory signal PCM word read only memory (ROM) 62 which is controlled by a ROM controller 63 in response to the main frame synchronization and system clock signals received via the synchronization lead 217. All of the supervisory signals such as dial tone, busy tone, etc., required for use in the system are stored in the ROM 62, in PCM format. The ROM 62 is controlled to provide all the PCM supervisory tone signals on a bit by bit basis, on a PCM word bus 64. Each PCM supervisory tone appears on a dedicated lead in the bus 64. Each information bit is present for the full duration of a frame, i.e. n time slot periods. A supervisory signal controller 65, similar to the memory 23 and the associated circuit elements 20 – 24 in the network circuit of FIG. 2, provides addresses, on an address bus 66, for accessing and directing the PCM words from the ROM 62. A supervisory signal space switch 67 produces time slot resident information signal bits by selecting bits of PCM words from the PCM word bus in response to the addresses from the controller 65 only during the first half of time slots as determined by system clock time two signals from one of the leads 217. Each of the selected information signal bits is transmitted on a predetermined path in the network bus. Thus the supervisory signal source in FIG. 5 provides supervisory tone signals which are compatible with the system PCM word formats, as illustrated in FIG. 6.

A Telephone Call

In operation as a TDC PCM telephone switching system, a simple telephone call follows a routing sequence of events. TIUs are addressed or scanned in Time Slot (TS) "0" by their associated network circuits 10. An off-hook telephone causes the related TIU to send a "1" bit in TS "0" thereby stopping the scanning from the network circuit at the moment the particular TIU is scanned. The peripheral signalling unit 210 responds to the cessation of scanning in the network circuit by sending a "1" bit in the next TS "0" to the TIU. In successive TS "0s" the TIU serially signals the off-hook condition of the user's telephone to the peripheral signalling unit. When the signalling is complete, the peripheral signalling unit resumes scanning of other terminals and sends an input interrupt signal to the CPU via a lead in the control bus 203. When it becomes available, the CPU responds to the interrupt signal by accepting the signalled data and terminal address data from the PIU and the associated network circuit. The CPU then does the following: (a) loads the network circuit memory 23 at a time slot address location with the terminal address which includes the TIU address and the supervisory tone signal circuit network path address; (b) loads the supervisory signal controller 65 at the same time slot address location with the address of the PCM dial tone words. Thereafter, during each reoccurrence of the time slot, the supervisory signal space switch extends the PCM dial tone signal from the ROM to the path in the network bus. The TIU is enabled during each reoccurrence of the time slot under the control of the network circuit memory. The space switch, under the control of the network circuit memory extends the appropriate network path to the outgoing line from the network so that the TIU receives the PCM dial tone signal and transmits an analogue dial tone to the telephone.

On receipt of dial tone, the telephone is operated by the user in the normal way by dialling the desired telephone number. Dialling is transmitted in successive TS "0s". In the case of dial pulses, each dial pulse requires a series of successive TS "0s" for its transmission. The CPU eventually receives all the dialling information, identifies the network circuit with which the dialled party is associated and loads the memory during a TS "0" with the called party's address. Under the direction of the CPU, the PIU sends, during time slot zero, a ringing instruction to the called party's TIU to apply ringing to the called telephone. Meanwhile, ringback is supplied from the supervisory tone signal circuit to the calling party. When the called party goes off-hook, the TIU ceases to apply ringing and the off-hook state is transmitted during time slot "0s" to the peripheral signalling unit which sends an interrupt signal to the CPU. When it becomes available, the CPU receives this information and responds thereto by a) disabling the ringback connection from the tone signalling circuit and b) loading the network circuit memory associated with each terminal with the terminal address and the opposite party's network path address. The network circuit memories are loaded with this information at adjacent time slot word locations, thereby enabling the system to establish a talking path.

The structure and method of operation of the system provides a flexibility which can accommodate the addition of various features. For example, a supervisory tone source, a music on hold feature or a conference feature can be provided by replacing one of the network circuits with the required feature circuit. Alternately these features can also be provided by circuitry connected to a network circuit via the incoming and outgoing paths. One such circuit is described in U.S. Pat. application Ser. No. 571,363 filed Apr. 24 1975, in the name of S. A. Inrig et al and entitled "Method and Apparatus for Establishing a Plurality of Simultaneous Conferences in a PCM Switching System".

The system utilizes a time delay to exchange information bits between time slots in fixed pairs of time slots. A time delay of N/2 time slot periods is described, and a time delay of $n$ time slot periods plus or minus one time slot period is described. The latter appears to accrue some simplification in the software for the CPU as compared with the $n/2$ time delay. Hence the time delay of $n \pm 1$ time slot periods has been described in conjunction with the example embodiment.

I claim:

1. In a TDM PCM communication system having a switching network connected to a plurality of user terminals via an incoming path and an outgoing path, a method for exchanging PCM words between one and another of said user terminals, said PCM words each having $m$ information bits distributed evenly across a frame of $n$ channels, the method comprising the steps of:
    a. generating sequences of an even number $n$ of time slot addresses;
    b. receiving a single information bit from the incoming path during the period of each time slot address occurrence;
    c. transmitting the information bits received during even time slot address occcurences with a delay of $n + 1$ time slot address periods, and transmitting the information bits received during odd time slot address occurrences with a delay of $n - 1$ time slot address periods;
    d. causing the one user terminal, during each occurrence of a predetermined even time slot address, to receive one of said transmitted information bits from the outgoing path and to simultaneously transmit, on the incoming path, an information bit advanced by one in the order of bit significance in the PCM word format relative to the information bit received from the outgoing path;
    e. causing the other user terminal, during each time slot address occurrence immediately following each occurence of said predetermined even time slot address, to receive one of said transmitted information bits from the outgoing path and to simultaneously transmit, on the incoming path, an information bit advanced by one in the order of bit significance in the PCM word format relative to the information bit received from the outgoing path;
    whereby $m$ bit PCM words are exchanged bit by bit between user terminals in fixed pairs of adjacent time slot periods.

2. In a TDM PCM communication system having a CPU for controlling the operation of the system, and a switching network connected to a plurality of user terminals via an incoming path and an outgoing path, a method of exchanging PCM words between said user terminals, said PCM words each having $m$ information bits distributed evenly across a frammе of $n$ channels, the method comprising the steps of: 'a. generating sequences of an even number $n$ of time slot addresses;
    b. receiving a single information bit from the incoming path during the period of each time slot address occurrence;
    c. transmitting the information bits received during even time slot address occurrences with a delay of $n + 1$ time slot address periods.
    d. storing terminal addresses, from the CPU, in $n$ word locations each word location corresponding to one of the $n$ time slot addresses, and transmitting a terminal address to the user terminals from each word location in response to each occurrence of its corresponding time slot address;
    e. causing each user terminal, in response to each occurrence of its own exclusive terminal address, to receive an information bit from the outgoing path, and on the incoming path to simultaneously transmit an information bit advanced by one in the order of bit significance in the PCM word format relative to the information bit received from the outgoing path;
    whereby $m$ bit PCM words are exchanged bit by bit between one user terminal for which there is a terminal address in a word location corresponding to an even terminal address, and another user terminal for which there is a terminal address residing in the adjacent word location corresponding to the odd time slot address immediately following said even time slot address.

3. A method as defined in claim 2 wherein, in step (e), $m$ information bits are transmitted sequentially according to their significance during each period of a phase two timing signal and $m$ information bits are received in the same sequence during each period of a phase one timing signal, the method further comprising the step of:
    f. generating the phase one timing signals and the phase two timing signals in synchronization with time slot address occurrences, the timing signals each having a period of $mn$ time slot periods, the phase one timing signal lagging the phase two timing signal by $n$ time slot periods.

4. In a TDM PCM communication system having a switching network connected to a plurality of user terminals via an incoming path and an outgoing path, a method for exchanging PCM words between one and another of said user terminals, said PCM words each having $m$ informtion bits distributed evenly across a frame of $n$ channels, the method comprising the steps of:
    a. generating sequences of an even number $n$ of time slot addresses;
    b. receiving a single information bit from the incoming path during the period of each time slot address occurrence;
    c. transmitting the received information bits with a delay of $n/2$ time slot address periods;
    d. causing the one user terminal, during each occurrence of one of the $n$ time slot address to receive one of said transmitted information bits from the outgoing path and to transmit, on the incoming path, an information bit advanced by one in the order of bit significance in the PCM word format relative to the formation bit received from the outgoing path;
    e. causing the other user terminal, during each time slot address occurrence delayed from said one time slot address by $n/2$ time slot address periods to receive one of said transmitted information bits from the outgoing path and to transmit, on the incoming path, an information bit advanced by one in the order of bit significance in the PCM word format relative to the information bit received from the outgoing path;

whereby $m$ bit PCM words are exchanged bit by bit, between user terminals, in fixed pairs of time slots, which are separated by $n/2 - 1$ time slot periods.

5. A TDM PCM communication system for exchanging PCM words, each having $m$ information bits distributed evenly across a frame of $n$ channels, between at least one and another user terminals of a plurality of user terminals connected to a switching network via an incoming path and an outgoing path, comprising:

means for generating sequences of an even number $n$ of time slot addresses;

control means for addressing said one user terminal during each occurrence of a predetermined even time slot address, and for addressing the other user terminal during each time slot address occurrence immediately following each occurrence of said predetermined even time slot address;

in the switching network storage means for receiving a single information bit from the incoming path during the period of each time slot address occurrence; and means for transmitting the information bits received during even time slot address occurrences with a delay of $n - 1$ time slot address periods, and transmitting the information bits received during odd time address occurrences with a delay of $n + 1$ time slot address periods;

in each user terminal, means for receiving one of said transmitted information bits from the outgoing path and for transmitting on the incoming path, an information bit, advanced by one in the order of bit significance in the PCM word format relative to the information bit received from the outgoing path, in response to being addressed by the control means;

whereby $m$ bit PCM words are exchanged bit by bit between user terminals addressed in fixed pairs of adjacent time slots.

6. A TDM PCM communication system having a switching network connected to a plurality of user terminals via an incoming path and an outgoing path, and a central processing unit for controlling the exchange of PCM words, each have $m$ information bits distributed evenly across a frame of $n$ channels, between the user termminls, comprising:

means for generating sequences of an even number $n$ of time slot addresses;

memory means, having $n$ word locations each word location corresponding to one of the $n$ time slot addresses, for storing terminal addresses from the CPU, and for transmitting a terminal address to the user terminals from each word location in response to each occurrence of its corresponding time slot address;

in the switching network, storage means for receiving an information bit from the incoming path during the period of each time slot address occurrence; means for transmitting the information bits received during even time slot addresss occurrences with a delay of $n + 1$ time slot address periods on the outgoing path, and transmitting the information bits received during odd time slot address occurrences with a delay of $n - 1$ time slot address periods on the outgoing path;

in each user terminal, means for receiving the terminal addresses, and means responsive to each occurrence of its own exclusive terminal address for receiving an information bit from the outgoing path, and on the incoming path, simultaneously transmitting an information bit advanced by one in the order of bit significance in the PCM word format relative to the information bit received from the outgoing path;

whereby $m$ bit PCM words are exchanged bit by bit between one user terminal for which there is a terminal address in a word location corresppondsing to an even time slot address, and another user terminal for which there is a terminal address residing in the adjacent word location corresponding to the odd time slot address immediately following said even time slot address.

7. A TDM PCM communication system as defined in claim 5 in which the storage means comprises;

a shift register having an input connected to the incoming path and first and second output terminals respectively connected to stages in the shift register for effecting $n + 1$ and $n - 1$ time slot period delays in the system; and in which the transmitting means includes:

a selecting circuit for selecting an information bit for transmission from either of said first or second output terminals in response to the instant time slot address being even or odd.

8. A TDM PCM communication system as defined in claim 6 in which the storage means comprises:

a shift register having an input connected to the incoming path and first and second output terminals respectively connected to stages in the shift register for effecting $n + 1$ and $n - 1$ time slot period delays in the system; and in which the transmitting means includes:

a selecting circuit for selecting an information bit for transmission from either of said first or second output terminals in response to the instant time slot address being even or odd.

* * * * *